United States Patent
Schwichtenberg et al.

(10) Patent No.: US 10,273,012 B2
(45) Date of Patent: Apr. 30, 2019

(54) DEICING MODULE FOR AN AIRCRAFT AND METHOD FOR DEICING

(71) Applicant: GE AVIATION SYSTEMS, LLC, Grand Rapids, MI (US)

(72) Inventors: Bryan E. Schwichtenberg, Palmyra, WI (US); Lance F. Miller, Rockford, IL (US); Julian A. Opificius, Elk River, MN (US)

(73) Assignee: GE Aviation Systems LLC, Grand Rapids, MI (US)

( * ) Notice: Subject to any disclaimer, the term of this patent is extended or adjusted under 35 U.S.C. 154(b) by 119 days.

(21) Appl. No.: 15/259,599

(22) Filed: Sep. 8, 2016

(65) Prior Publication Data

US 2018/0065753 A1 Mar. 8, 2018

(51) Int. Cl.
*B64D 15/16* (2006.01)
*B64C 3/26* (2006.01)

(52) U.S. Cl.
CPC .............. *B64D 15/16* (2013.01); *B64C 3/26* (2013.01)

(58) Field of Classification Search
CPC ..... B64D 15/16; B64D 15/163; B64D 15/166
See application file for complete search history.

(56) References Cited

U.S. PATENT DOCUMENTS

| | | | | |
|---|---|---|---|---|
| 1,944,484 A | * | 1/1934 | Ajello | B64D 15/16 244/134 R |
| 2,201,155 A | * | 5/1940 | Burgess | B64D 15/16 244/134 A |
| 2,297,951 A | * | 10/1942 | Frank | B64D 15/16 244/134 A |
| 2,309,010 A | * | 1/1943 | Peter | B64D 15/02 126/247 |
| 2,343,986 A | * | 3/1944 | Leutholt | B64D 15/16 244/134 A |
| 2,471,894 A | * | 5/1949 | Pulver | B64D 15/16 244/134 A |
| 4,706,911 A | | 11/1987 | Briscoe et al. | |
| 5,553,815 A | | 9/1996 | Adams et al. | |
| 8,439,309 B2 | * | 5/2013 | Cardell | B64D 15/16 244/134 E |
| 9,061,752 B2 | * | 6/2015 | Nagel | B64C 3/48 |

FOREIGN PATENT DOCUMENTS

| | | | | |
|---|---|---|---|---|
| DE | 652 020 C | | 10/1937 | |
| DE | 652020 C | * | 10/1937 | B64D 15/16 |
| FR | 832205 A | * | 9/1938 | B64D 15/16 |
| GB | 721987 A | * | 1/1955 | B64D 15/16 |
| WO | 2009/019696 A2 | | 2/2009 | |

OTHER PUBLICATIONS

International Search Report and Written Opinion issued in connection with corresponding PCT Application No. PCT/US2017/47926 dated Nov. 29, 2017.

* cited by examiner

*Primary Examiner* — Richard R. Green
(74) *Attorney, Agent, or Firm* — General Electric Company; Sean M. Weinman (57) ABSTRACT

An apparatus and method for deicing a surface upon which ice accumulates, on for example an aircraft wing. The apparatus and method for the deicing module include an actuating component, a casing, and a movable member. The movable member breaks ice that has accumulated on a surface of the wing.

14 Claims, 7 Drawing Sheets

DEICING MODULE FOR AN AIRCRAFT AND METHOD FOR DEICING

BACKGROUND OF THE INVENTION

Contemporary turbo-prop engine aircraft include wings having surfaces that can be susceptible to ice accumulation in certain flying conditions. Aircraft approved for flight into known icing conditions must include provisions to prevent unacceptable levels of ice accumulation on the wings. Ice build-up on the wings affects the aerodynamic efficiency of the wing. Limiting the amount of ice build-up or accumulation increases aerodynamic efficiency.

Conventional aircraft can include electrical or pneumatic heating systems to provide cyclic or continuous heating of aerodynamic surfaces and/or propeller blades to control the build-up, accumulation, or shedding of ice. Conventional aircraft can also use an inflated rubber membrane (often called a "boot") which is cyclically inflated with air pressure. This approach is limited to slower moving aircraft due to the increased aerodynamic drag penalty. Another approach is a set of electromagnetic or piezo-electric actuators installed beneath the protected surface and are cyclically operated at a high frequency to fracture the ice. Another common approach for small general aviation aircraft and UAVs is to pump de-icing fluid and deliver it to the protected areas via spray nozzles or thru weep holes.

BRIEF DESCRIPTION OF THE INVENTION

In one aspect, the present disclosure relates to a deicing module for an aircraft with a casing operably coupled to an aircraft surface, at least one moveable member located between the casing and the aircraft surface, a driving mechanism operably coupled to the at least one moveable member and configured to move the at least one moveable member beneath the casing such that the at least one moveable member distorts the casing to an extent sufficient to release accumulations of ice thereon.

In another aspect, the present disclosure relates to an aircraft wing, comprising a set of ribs that define a depth and shape of an airfoil of the aircraft wing, where the airfoil includes a leading edge, an upper surface, a lower surface, and a trailing edge spaced from the leading edge, at least one spar interconnecting the set of ribs, at least one skin covering at least a portion of the airfoil, and a deicing mechanism, comprising a casing covering at least a portion of the leading edge, at least one moveable member located between the casing and the aircraft surface, a driving mechanism operably coupled to the at least one moveable member and configured to move the at least one moveable member beneath the casing such that the at least one moveable member distorts the casing to an extent sufficient to release accumulations of ice thereon.

In yet another aspect, the present disclosure relates to a method for deicing a surface upon which ice accumulates, the method comprising moving at least one moveable member beneath the surface such that the at least one moveable member distorts the surface to an extent sufficient to release accumulations of ice thereon and wherein the at least one moveable member is moved beneath the surface to sequentially release accumulations of ice thereon.

DESCRIPTION OF EMBODIMENTS OF THE INVENTION

The various aspects described herein are related to preventing or reducing build-up, accumulation, or shedding of ice on an aircraft wing. Embodiments of the disclosure can be implemented in any environment, apparatus, or method for preventing or reducing ice on a surface, regardless of the function performed by the surface. By way of non-limiting example such surface is that of a wing of an aircraft where the aircraft can have a turbo-prop engine or turbo-fan jet engine or any other suitable engine for an aircraft. Thus, the remainder of this applications focuses on such an environment.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the term "span-wise" refers to a dimension along the length of the wing and "chord-wise" refers to a dimension along the width of the wing.

Furthermore, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
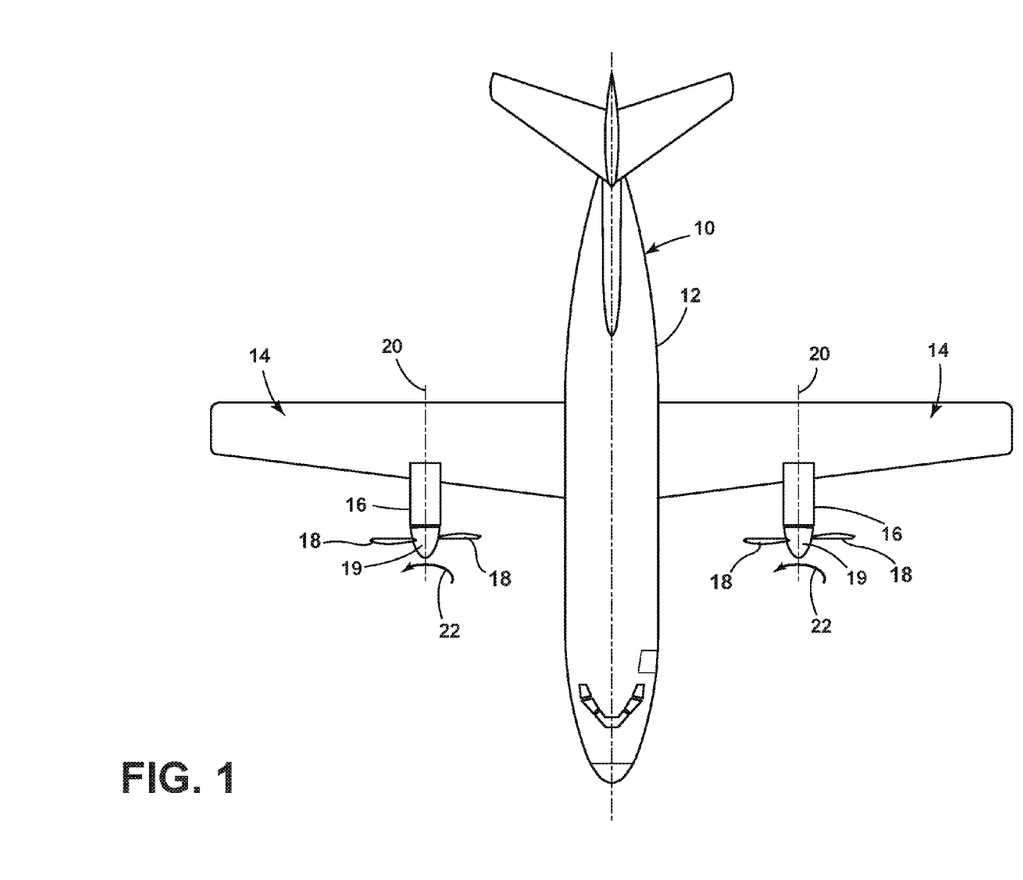
FIG. 1 illustrates an example schematic top view of an aircraft having wings and propellers in accordance with various aspects described herein.

FIG. 1 depicts an aircraft 10 having a fuselage 12 and wings 14 extending outward from the fuselage 12. The aircraft 10 can include at least one turbo-prop engine 16 coupled to the aircraft 10, shown as a set of engines 16 coupled with the opposing wings 14. The turbo-prop prop engine 16 can include a set of propeller blades 18 coupled with the engine 16 at a rotatable hub assembly 19, such that the engine 16 drives the rotation 22 of the propellers about an axis of rotation 20.

While an aircraft 10 having two turbo-prop prop engines 16 has been illustrated, embodiments of the disclosure can include any number of engines 16 or propeller blades 18, or any placement of the engine 16 or blades 18 relative to the aircraft. Additionally, the rotation 22 of the propeller blades 18 is provided for understanding of the embodiments of the disclosure. Embodiments of the disclosure can include alternative directions of rotation 22 of the propeller blades 18, or embodiments wherein a set of turbo-prop engines 16 rotate propeller blades 18 in the same or opposing directions.

Figure 2:
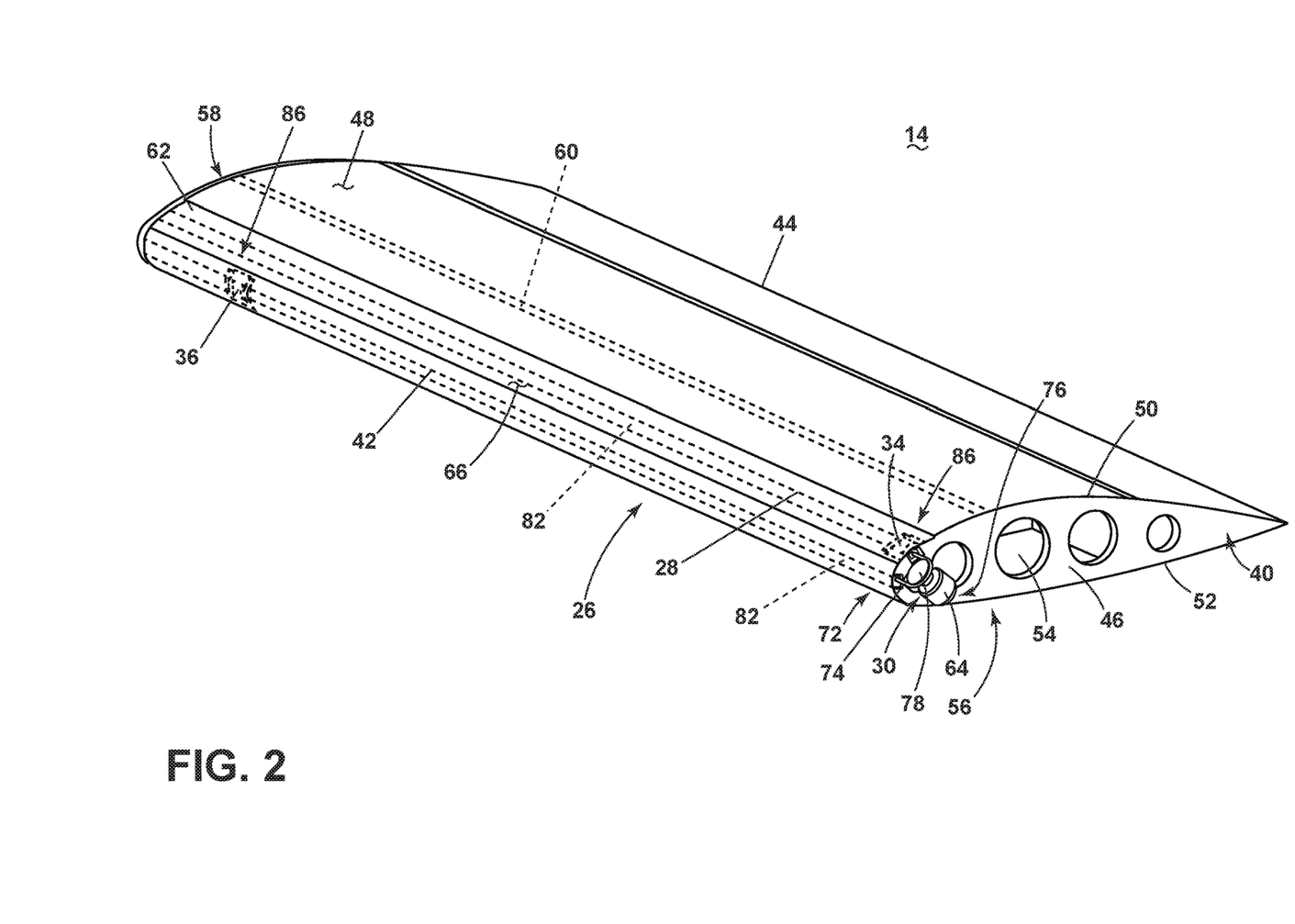
FIG. 2 is a perspective view of a wing in accordance with various aspects described herein and that can be included in the aircraft of FIG. 1.

FIG. 2 depicts an enlarged perspective view of an exemplary portion of one of the wings 14, which includes an airfoil 40 having a leading edge 42 and a trailing edge 44. The leading edge 42 can provide torsional stiffness while the trailing edge 44 can be flexible, stiff, or a combination of both. A set of ribs 46 defines the depth and shape of the airfoil 40. A skin 48 covers at least a portion of the airfoil 40 and include an upper surface 50 and a lower surface 52 extending from the leading edge 42 to the trailing edge 44 to define an interior 54. The interior 54 runs span-wise from a root section 56 to a tip section 58 of the wing 14. At least one spar 60 interconnects the set of ribs 46 and runs span-wise within the interior 54. The wing 14 can be formed from a combination of carbon fiber, aluminum alloy, titanium or any suitable material.

A deicing module 26 is also illustrated and includes a casing 28, a driving mechanism 30, and at least one movable member 34. The deicing module 26 can be mounted or otherwise attached to the wing 14 at the leading edge 42. For example, a set of tracks 82 is mounted to set of ribs 46 (FIG. 3) and located in the interior 54 of the wing 14. Other attachment assemblies can be contemplated having mounting features including magnets, curved tracks, ball bearings, sets of rails or the like. In the illustrated example, the tracks are inset into the set of ribs 46 such that the airfoil shape of the wing 14 is not substantially changed.

The casing 28 can be a flexible casing 28 covering the skin 48 including at least a portion of the leading edge 42 or the whole leading edge 42. The flexible casing 28 can extend chord-wise from the leading edge 42 to the upper surface 50 of the airfoil 40. It can be contemplated that the flexible casing can also extend from the leading edge 42 to the lower surface 52, or any other suitable location. The flexible casing 28 can be a rubber mat 62 made of for example though not limited to neoprene rubber, or any suitable elastic material. It is also contemplated that the material can be a metallic material having fatigue and strength limits within the flexible constraints. The flexible casing 28 includes a surface 66 upon which ice can accumulate.

The driving mechanism 30 can be located at for example, but not limited to, the root 56 of the wing 14 and can include for example, though not limited to, a rotary actuator 64. The driving mechanism 30 further includes, for example but not limited to a cable system 72 as illustrated. Other systems can also be contemplated including, but not limited to, a chain, belt, or screw drive system or a combination of all or parts of such a system. The cable system 72 includes a cable 74, motor 76, and pulley 78. The cable system 72 could be for example a jack screw, or any other suitable mechanism capable of lateral movement along the leading edge 42 of the wing 14.

Figure 3:
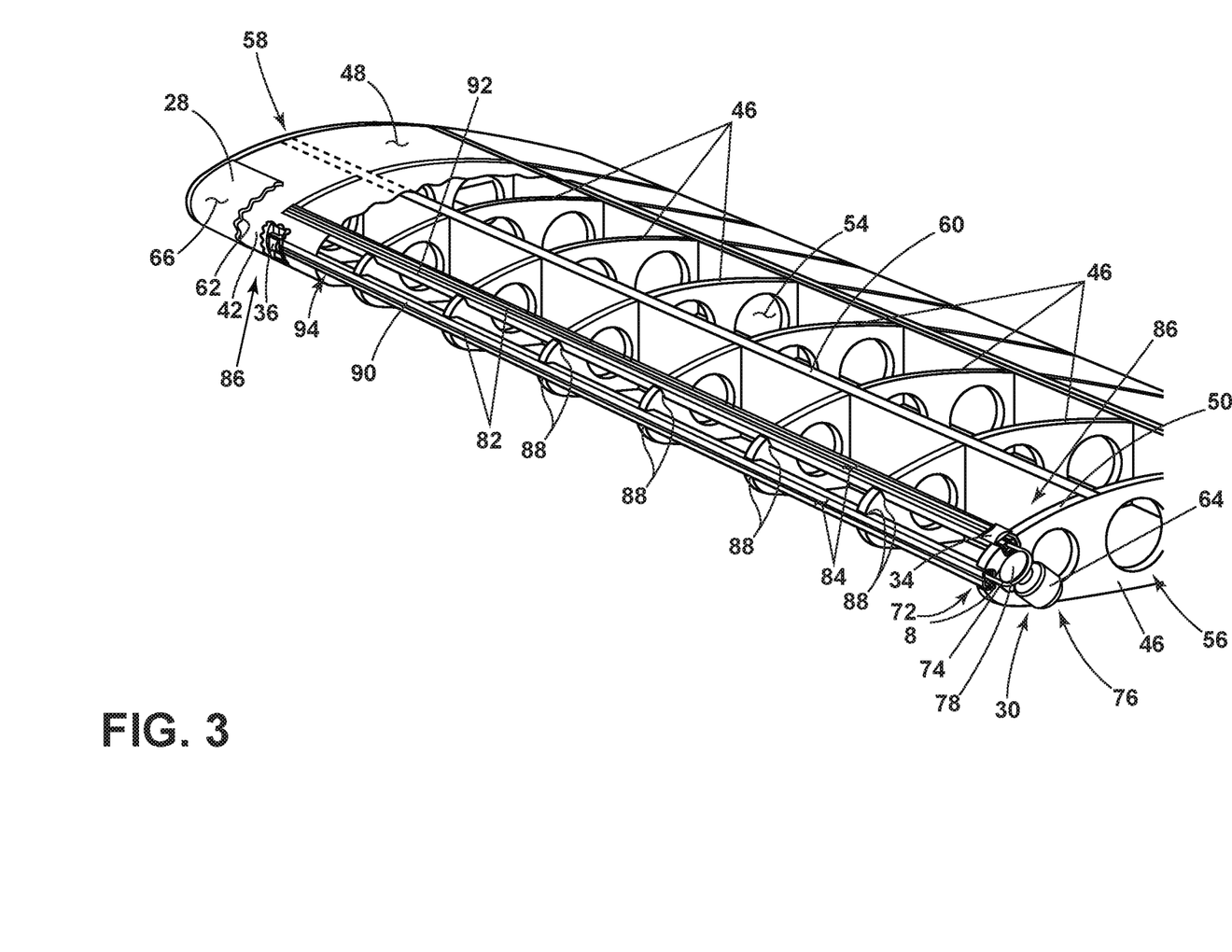
FIG. 3 is a perspective view of the wing of FIG. 2 with a top surface removed in accordance with various aspects described herein.

Turning to FIG. 3, the skin 48 of the wing and the flexible casing 28 have been cut away to reveal the set of ribs 46 having grooves 88 through which the set of tracks 82 can extend.

The cable 74 is wrapped around the pulley 78 and coupled to at least one movable member 34. The cable 74 extends into a set of tracks 82. The set of tracks are recessed in the ribs 46 and can include a channel 80 having an exemplary rectangular cross-section. The movable member 34 is provided along an outer surface 84 of the set of tracks 82 and below the flexible casing 28 at a starting position 86 near one of the root 56 or the tip 58 of the wing.

The set of tracks 82 can include a first track 90 located along the leading edge 42 and a second track 92 located along the upper surface 50 of the airfoil 40. While depicted as two tracks 82 it should be understood that the wing 14 can include one or more tracks 82.

Figure 4:
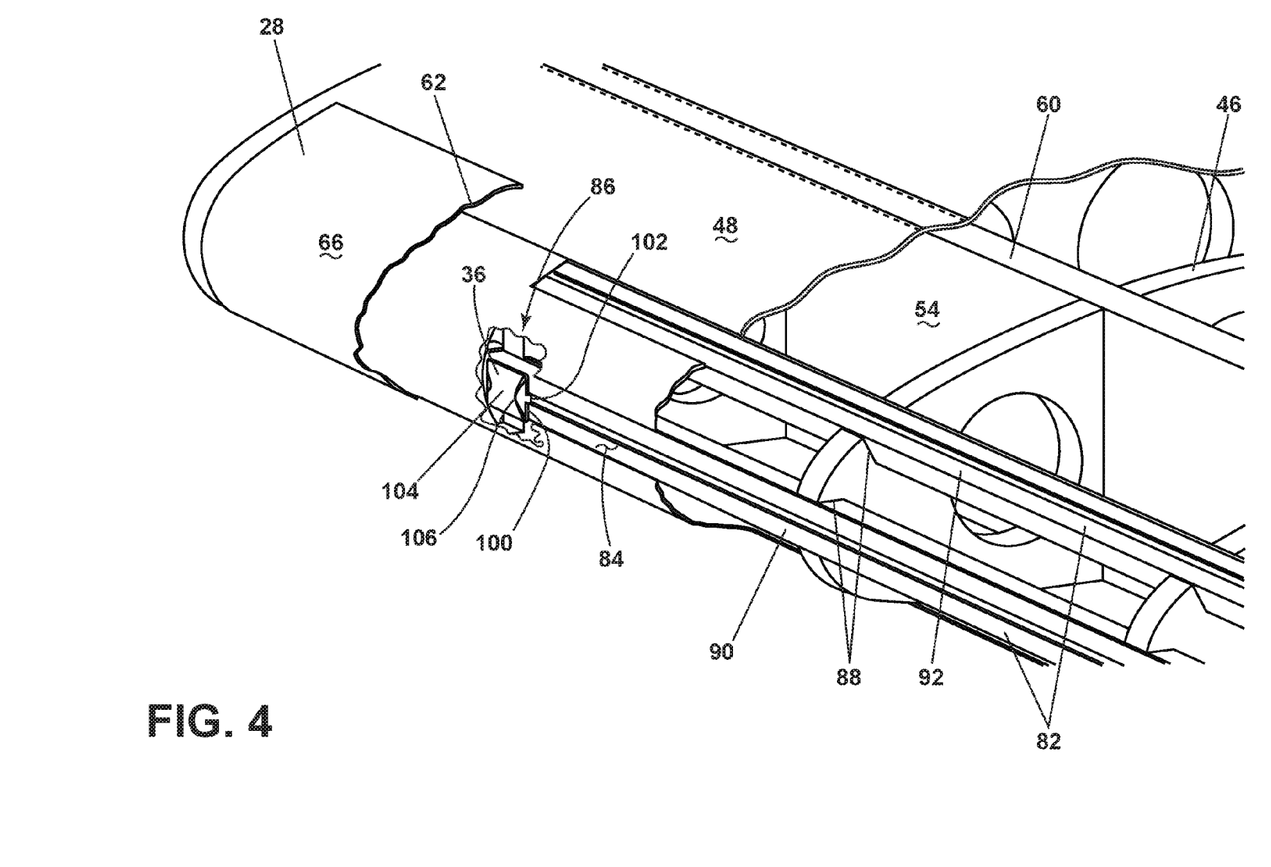
FIG. 4 is an enlarged view of one end of the wing of FIG. 2 in accordance with various aspects described herein.

FIG. 4 is an enlarged view of the movable member 34 at the starting position 86 near the tip 58 of the wing 14. Part of the flexible casing 28 has been cut away along with the skin 48 of the wing 14.

The at least one movable member 34 can include any number of members including multiple movable members. Two moving members are illustrated as a first movable member 34 and a second movable member 36. The movable member 34 includes a base 100, illustrated as, but no limited to a square shape, that confronts the outer surface 84 of the first track 90. At a middle 102 of the base 100 the movable member 34 is coupled to the cable 74. A curved face 104 extends out from the base and terminates in a tip 106 where the movable member 34 is configured to abut the flexible casing 28. The base 100 can be any suitable shape conforming to any suitable corresponding track 82 shape, for example but not limited to circular, square, or angular.

Figure 5:
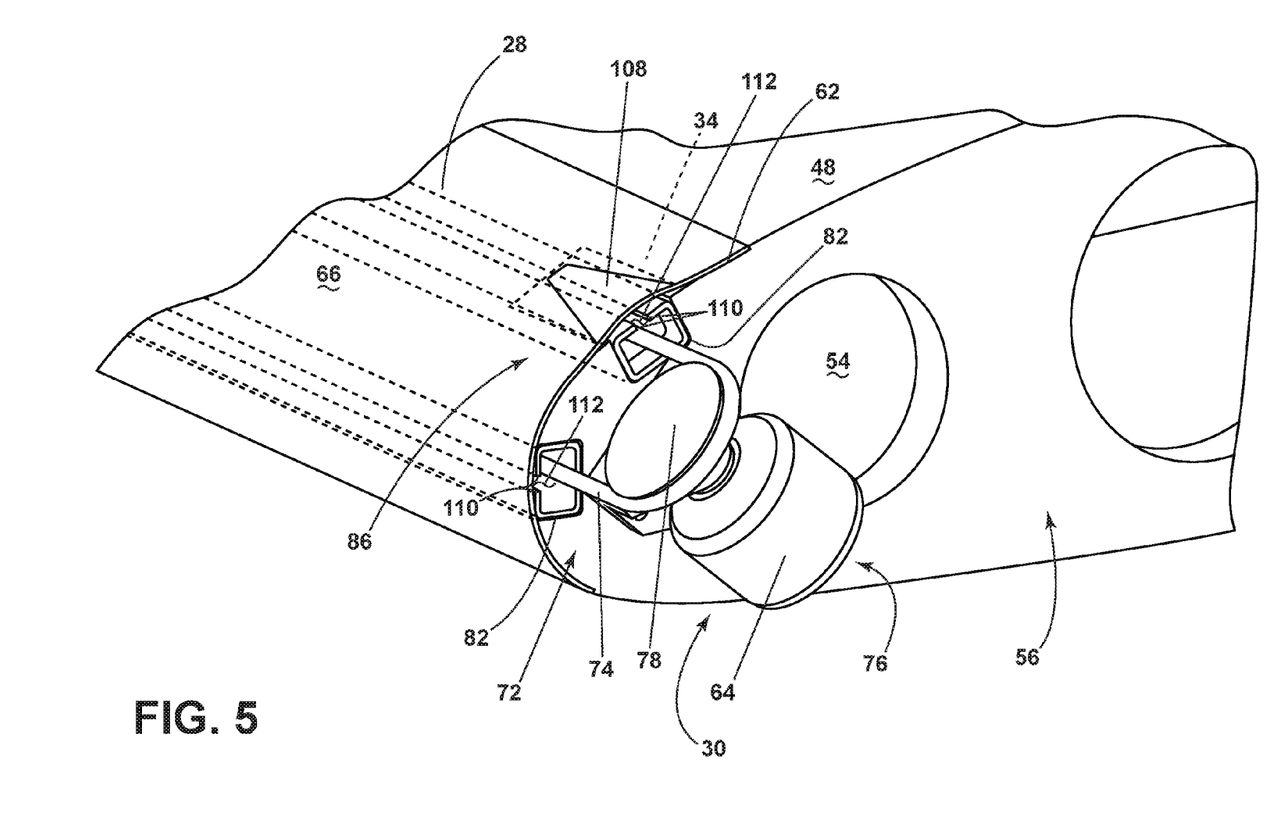
FIG. 5 is an enlarged view of a second end of the wing of FIG. 2 in accordance with various aspects described herein.

FIG. 5 is an enlarged view of the root 56 of the wing 14 where the rotary actuator 64 is coupled to the rib 46. The flexible casing 28 is shown in place and includes a deformed portion 108 where the movable member 34 abuts the flexible casing 28. The first and second tracks 90, 92 are shown as substantially rectangular and have confronting sides 110 that define a gap 112.

Figure 6:
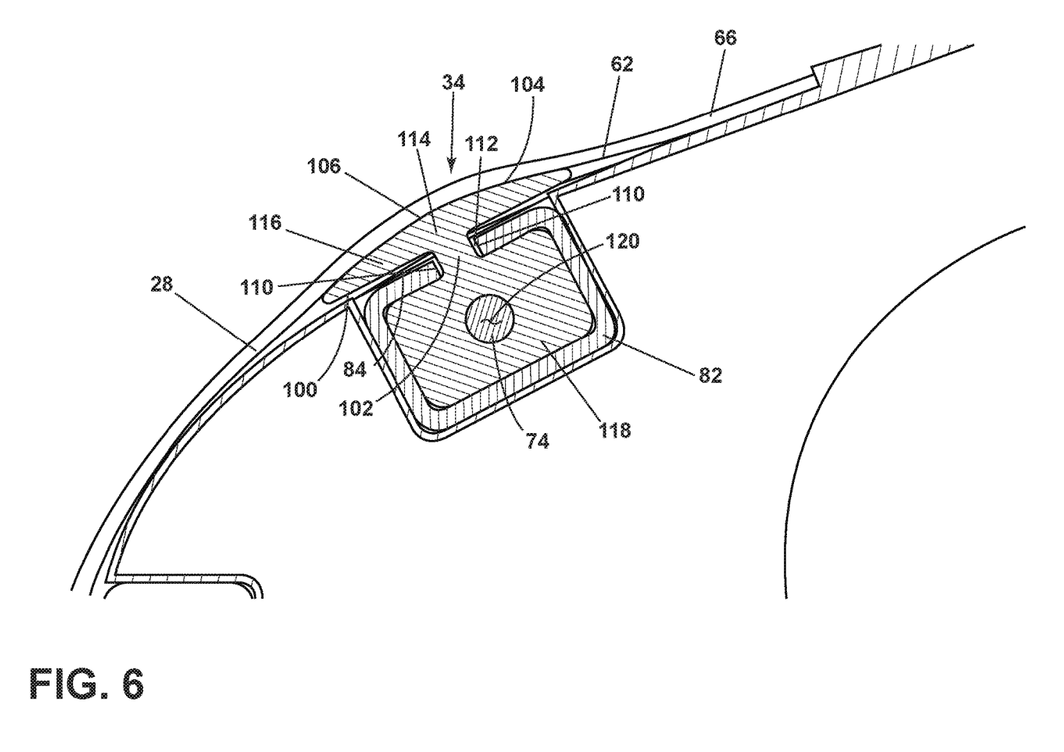
FIG. 6 is a cross-section of a front of the wing of FIG. 2 in accordance with various aspects described herein.

Turning to FIG. 6, a cross-section of the movable member 34 includes the curved face 104 and tip 106 that together form an upper portion 114 of the movable member 34 configured to abut the flexible casing 28. The profile of the movable member 34 conforms to the wing 14 to maintain aerodynamic integrity and not decrease efficiency. The upper portion 114 includes a thin profile 116 conforming to the upper surface 50 of the airfoil 40.

At the middle 102 of the movable member 34 the upper portion 114 is coupled to a lower portion 118 formed as any shape capable of being received within the track 82. The cable 74 passes through and is operably coupled to a middle section 120 of the lower portion 118.

While illustrated as provided along an outer surface 84 of the set of tracks 82 and below the flexible casing 28 it is understood that the movable member 34 can be provided in any suitable manner so as to not bind or twist when in operation.

While characterized as a movable member having a curved face terminating in a tip it will be understood that the shape of the movable member can vary. The movable member could also be a ball operably coupled to the set of tracks. It should be further understood, that while depicted on the wing of an aircraft, the deicing module can be implemented in other areas of the aircraft, for example, but not limited to, the nacelle, or on other devices for example, but not limited to, windmills, propellers, tail sections, stabilizers, flaps.

In operation the rotary actuator 64 can be actuated when the pilot of the aircraft turns on a de-icing setting in the event ice has accumulated on the wings 14. The rotary actuator 64 will rotate, turning the pulley 78 and in turn provide lateral movement of the cable within the set of tracks 82. The set of tracks 82 are configured to guide the two movable members 34, 36 laterally in opposite directions along the length of the wing 14 whilst deforming the flexible casing 28. The location of the movable members 34, 36 in a location opposite of each other allows for minimizing any out of balancing that may occur on the wing 14. When each of the movable members 34, 36 reach the opposite end of the track 82 from their starting position 86, a switch (not shown) is set to reverse the motor 76 and return the movable members 34, 36 to their respective starting positions 86. It can also be contemplated that each movable member 34, 36 can remain at the opposite end of the track 82 until another de-ice operation is actuated. The deformation of the flexible casing 28 can break ice that has accumulated on the surface 66. It is also contemplated that the movable members 34, 36 can move automatically upon receiving a signal of ice detection on the wing.

Figure 7:
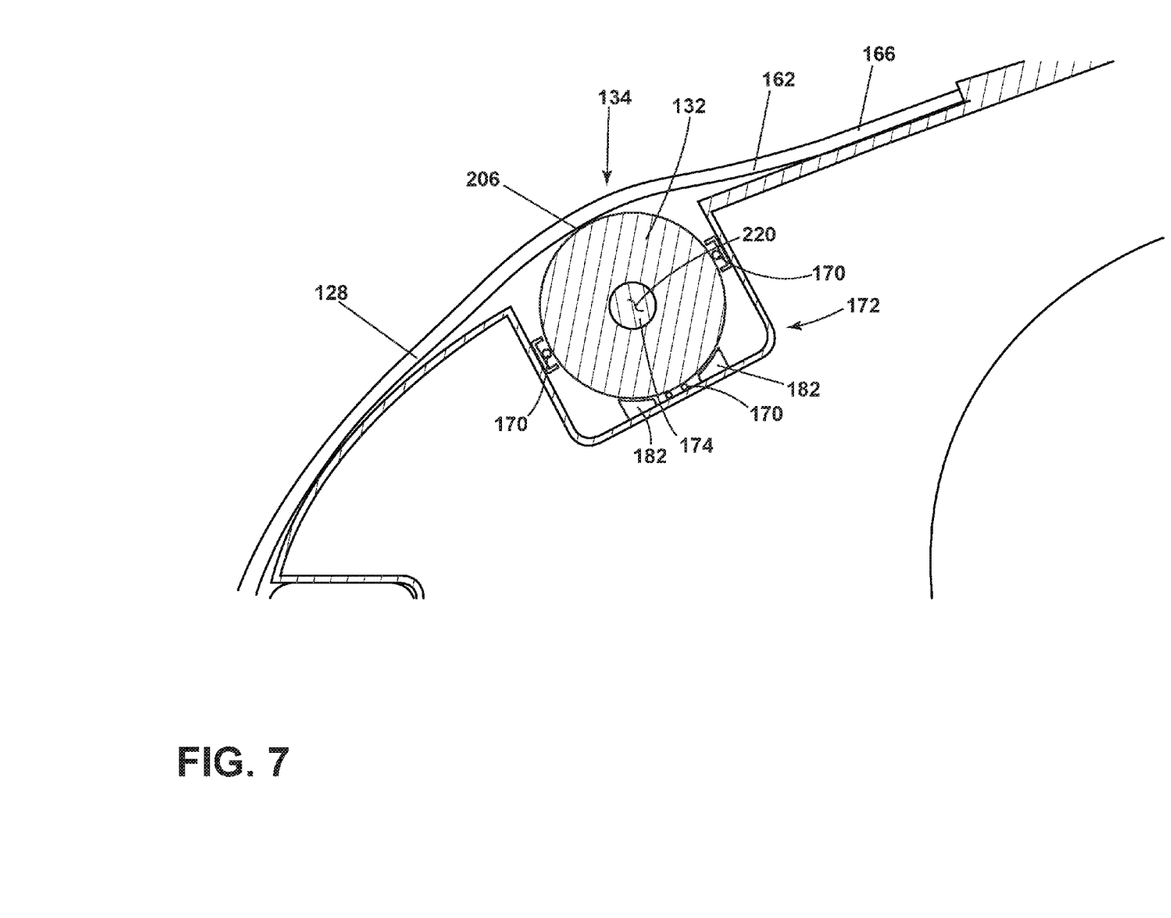
FIG. 7 is a cross-section of an additional embodiment of a front of the wing of FIG. 2 in accordance with various aspects described herein.

A cross-section of a movable member 134 similar to the movable member 34 is contemplated in FIG. 7, therefore like parts will be identified with like numerals increased by 100. It is understood that the description of the like parts of the movable member 34 applies to the movable member 134, unless otherwise noted.

A deicing module, such as deicing module 26, can include a rotating system 172 having the movable member 134, which by way of a non-limiting example is a ball 132, wherein the ball 132 is configured to continuously move laterally along a leading edge of a wing, such as the leading edge 42 of wing 14. The rotating system 172 includes a cable 174 that runs through the ball 134 and is configured to rotate continuously such that the ball 132 slides along a set of tracks 182. The rotating system 172 can include rolling element bearings 170 to keep friction losses low.

A method for deicing the surface 66 upon which ice accumulates can include moving at least one moveable member 34 beneath the surface 66 such that the at least one moveable member 34 distorts the surface 66. The extent to which the surface is distorted is sufficient to release any accumulation of ice upon the surface 66. A sufficient distortion can be between $\frac{1}{8}$ inch and $\frac{1}{2}$ inch, or on an order of magnitude that is less than that of a pneumatic boot which is around 1 inch.

The at least one moveable member 34 can be moved to adjacent portions of the surface 66 to sequentially release accumulations of ice. It is further contemplated that in moving the movable member 34 to adjacent portions of the surface 66, ice is released from the surface and therefore removed. The releasing of the ice is due to breaking already accumulated ice, or preventing ice that has begun the process of formation from complete formation.

The moving can be for example, though not limited to a lateral moving along a length of the surface as illustrated herein, or a circular moving under a portion of the surface, or a sinusoidal moving, or any suitable moving for distorting the surface to release an accumulation of ice.

The method can further include actuating a driver operably coupled to the at least one moveable member. The driver can be any driving mechanism, such as the rotary actuator 64 described herein.

Historically wing device has presented a continuing challenge to the aviation industry. Current device technologies typically require bleed air to heat the wing which reduces engine efficiency and increases fuel consumption, glycol weeping wings, which include additional weight and have a limited time duration, electric heaters requiring significant power and again reducing engine efficiency, electro-repulsives which rely on mechanical vibration methods that can have acoustically uncomfortable effects and can increase structural stresses on the surface and airframe, and boot inflation systems that must remain air tight and add additional weight. Boots also create significant aerodynamic drag and are typically limited to slower propeller driven aircraft. These current technologies can reduce efficiency, increase power use, add weight, and require higher maintenance. The method considered here overcomes these issues by providing a low power method of mechanically removing accumulated ice.

Advantages to the deicing module described herein include low weight for the actuation and drive assembly with no need for storing additional liquid on board the aircraft. The mechanical travel of the movable member requires low power usage because has a low duty cycle (one operation every few minutes, and it does not have to provide enough energy to melt the ice and evaporate the water like thermal ice protection). Eliminating the need for bleed air to heat the wing surfaces or to inflate and deflate rubber boots increases efficiency of the engine and allows for bleed air to be used elsewhere. The smooth lateral movement of the deicing module is acoustically quiet and dramatically lowers the number of repetitive stress cycles to the protected surfaces compared to electro-expulsive ice protection systems.

Commercial advantages include a high technology readiness level for the individual components leading to a lower development and material cost. Increasing the fuel efficiency during flight lowers operating costs. Another benefit includes improved maintenance over current boot based deicing systems because the flexible casing described herein does not require an air tight seal.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure. Further, it will be understood that many other possible embodiments and configurations in addition to those shown in the above figures are contemplated by the present disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A deicing module for an aircraft comprising:
   a casing operably coupled to an aircraft surface where the aircraft surface encloses an interior of a wing of the aircraft;
   at least two tracks inset within the interior of the wing;
   at least two moveable members configured to move within their respective at least two tracks in opposite directions where an upper portion of each of the at least two movable members is located between the casing and the aircraft surface and a lower portion of the at least two moveable members is located within the track; and
   a driving mechanism operably coupled to the at least two movable members and configured to move the at least one moveable member having a profile that conforms to the aircraft surface beneath the casing such that the at least one moveable member distorts the casing to an extent sufficient to release accumulations of ice thereon.

2. The deicing module of claim 1 wherein the casing is a flexible casing comprising a mat formed from elastomeric or metallic material.

3. The deicing module of claim 2 wherein the mat covers at least a portion of a leading edge of a wing.

4. The deicing module of claim 1 wherein the driving mechanism comprises a rotary actuator operably coupled to the at two movable members.

5. The deicing module of claim 4 wherein the driving mechanism further comprises a jack screw or a cable system operably coupling the rotary actuator to the at least two movable members.

6. The deicing module of claim 5 wherein the driving mechanism is reversible.

7. The deicing module of claim 1 wherein at least one of the at least two movable members is a ball in a continuous rotating system.

8. An aircraft wing, comprising:
   a set of ribs that define a depth and shape of an airfoil of the aircraft wing, where the airfoil includes a leading edge, an upper surface, a lower surface, and a trailing edge spaced from the leading edge and grooves are located within the set of ribs;
   at least one spar interconnecting the set of ribs;
   at least one skin covering at least a portion of the airfoil; and
   a deicing mechanism, comprising:
   a casing covering at least a portion of the leading edge;
   at least two tracks extending through the grooves;
   at least two movable members each having an upper portion with a profile that conforms to the aircraft surface located between the casing and the upper surface and each having a lower portion located within the at least one track; and
   a driving mechanism operably coupled to the at least two movable members and configured to move the at least one moveable member beneath the casing such that the upper portion of the at least two movable members distorts the casing to an extent sufficient to release accumulations of ice thereon.

9. The aircraft wing of claim 8 wherein the casing is a flexible casing comprising a mat formed from elastomeric or metallic material.

10. The aircraft wing of claim 8 wherein the at least two movable members include a first moveable member and a second moveable member.

11. The aircraft wing of claim 10, wherein the at least two tracks are configured to guide the first movable member and the second movable member.

12. The aircraft wing of claim 11 wherein the first moveable member moves axially along the leading edge and the second moveable member moves axially along the upper surface.

13. The aircraft wing of claim 8 wherein the at least two movable members are configured to deform on a portion of the casing.

14. The aircraft wing of claim 8 wherein the upper portion of the at least one moveable member includes a thin profile conforming to the airfoil.

* * * * *